United States Patent [19]

Dang et al.

[11] Patent Number: 5,492,996

[45] Date of Patent: Feb. 20, 1996

[54] ALCOHOL SOLUBLE BENZAZOLE POLYMERS

[75] Inventors: Thuy D. Dang, Centerville; Jom P. Chen, Hilliard; Fred E. Arnold, Centerville, all of Ohio

[73] Assignee: The United States of America as represented by the Secretary of the Air Force, Washington, D.C.

[21] Appl. No.: 393,590

[22] Filed: Feb. 21, 1995

[51] Int. Cl.$^6$ .................................. C08G 75/00
[52] U.S. Cl. .................... 528/171; 528/172; 528/173; 528/186; 528/328; 528/337; 528/341; 528/342; 528/344; 528/347; 528/367; 528/403; 528/408; 528/411
[58] Field of Search ....................... 528/171, 172, 528/173, 186, 328, 337, 341, 342, 344, 347, 367, 403, 408, 411

[56] References Cited

U.S. PATENT DOCUMENTS 5,312,895  5/1994  Dang et al. ........................... 528/337
5,316,695  5/1994  Wilkes et al. ........................ 252/315.6

Primary Examiner—Shelley A. Dodson
Attorney, Agent, or Firm—Charles E. Bricker; Thomas L. Kundert

[57] ABSTRACT

Alcohol-soluble aromatic heterocyclic polymers having repeating units of the formula:

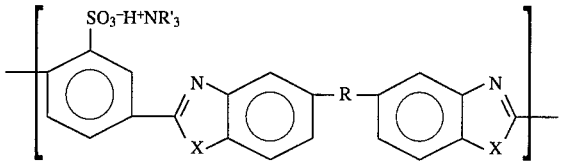

wherein X is —O— or —S—, and R is selected from the group consisting of:

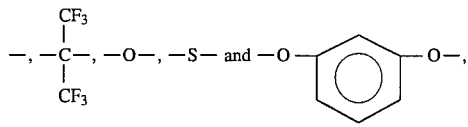

and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups.

The alcohol-soluble polymers may be used for fabricating organic/inorganic hybrid composites with metal alkoxides $M(OQ)_n$, wherein M is Si, Ti, Al or the like and Q is a lower alkyl group. These polymers can also be used to coat materials or substrates which are susceptible to attack by highly corrosive acids. On drying, the ionic bond between the trialkylamine and the sulfo group is broken and the polymer reverts to the parent structure, thereby leaving a polymer coating. Yet further, the original amine can be exchanged with a less volatile amine or an amine having a desired functionality. After removal of the solvent, the resulting material is mono-dispersed and stable.

13 Claims, No Drawings

ALCOHOL SOLUBLE BENZAZOLE POLYMERS

RIGHTS OF THE GOVERNMENT

The invention described herein may be manufactured and used by or for the Government of the United States for all governmental purposes without the payment of any royalty.

BACKGROUND OF THE INVENTION

The present invention is directed to heterocyclic copolymers, particularly benzoxazole and benzothiazole polymer systems which are soluble in lower alkyl alcohols.

Sol-gel processing of ceramics and glass is an area of intense research interest because of inherent advantages compared to more conventional processing. By starting with well mixed solutions or sols, chemical homogeneity even on the molecular scale can be obtained.

A great variety of metal alkoxides are commercially available. Still others have been synthesized for specific uses. The alkoxides are utilized by first partially hydrolyzing the alkoxide,

where Q represents a lower alkyl group and M represents Si, Ti, Al and the like, as well as mixtures thereof. The partially hydrolyzed species are then allowed to link forming M—O—M bonds by a polymerization or condensation reaction.

The majority of work done on sol-gel of polymerized alkoxides has been done for glasses. Much of this centers around $SiO_2$ glasses or high $SiO_2$ glasses. The growing use of optical fibers for transmission of information at high rates has provided an incentive to seek fabrication methods for optical grade $SiO_2$ glass which is less expensive than vapor phase methods. Further, silicon alkoxides exist which are inexpensive, highly pure and easily polymerized to gels. The most common of these is tetraethylorthosilicate (TEOS), $Si(C_2H_5O)_4$, the ethoxide of silicon. When an alcohol (e.g., ethanol) is used as a mutual solvent, TEOS can be mixed with water. This mixture is slow to hydrolyze, but the rate can be increased by additions of acids or bases as catalysts. Acid catalyzed gels form transparent gels which appear to be rather uniform polymers. Base catalyzed gels are not as transparent and are thought to contain $SiO_2$ clusters which then link together to form a gel.

In the case of TEOS, the mechanism for gel formation is polymerization after partial hydrolysis of $Si(C_2H_5O)_4$ to have both ethyl groups and hydroxide groups attached to the Si:

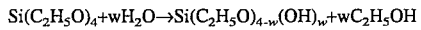

Reaction of an OH group on one Si with a $C_2H_5O$ group on another releases another alcohol molecule and forms a siloxane bond, Si—O—Si, at all temperatures close to ambient. These siloxane bonds form the basis for the polymerization and thus the gelation.

Such gels contain large amounts of water and alcohol, leaving a low density of $SiO_2$. Drying such gels results in large shrinkages as liquid-filled pores partially collapse. Since the liquid content of the gel is large and the pores are small, liquid transport is slow and rapid drying leads to large shrinkages near the gel body surfaces. Because the mechanical strength of the gel is low, these non-uniform shrinkages lead to cracking.

Several studies have demonstrated the successful incorporation of various functionalized oligomers into a sol-gel network to produce novel organic/hybrid materials referred to as 'ceramers'. Such studies have involved, for example, a sol-gel reaction using tetramethylorthosilicate (TMOS) or TEOS and silanol-terminated poly(dimethylsiloxane). Other systems investigated were hybrids based upon TEOS or TMOS, or related metal alkoxides, reacted with an oligomer of poly(tetramethylene oxide) endcapped with isocyanatopropyltriethoxysilane. Wilkes et al, U.S. Pat. No. 5,316,695, disclose the use of a polymeric catalyst, such as poly(styrenesulfonic acid), in such a system.

Organic/inorganic hybrid materials prepared through sol-gel processing have the potential to possess the desired properties of both organic and inorganic components, such as high tensile modulus, scratch resistance, thermal and dimensional stability from the inorganic network, as well as toughness, flexibility and light weight from the organic portion. A variety of high performance, thermally stable polymeric structures are known, but they are intractable and virtually impossible to process. Aromatic heterocyclic polymers are the most attractive high temperature, high performance polymer systems. Although these polymers have excellent high temperature properties, they exhibit solubility only in high boiling aprotic or acidic solvents.

Accordingly, it is an object of the present invention to provide aromatic heterocyclic polymers having improved solubility properties.

It is another object of the present invention to provide aromatic heterocyclic polymers having functionality for co-reaction with metal alkoxides for preparing ceramers.

Other objects and advantages of the present invention will be apparent to those skilled in the art.

SUMMARY OF THE INVENTION

In accordance with the present invention there are provided aromatic heterocyclic polymers which are soluble in lower alkyl alcohols. These alcohol-soluble polymers have repeating units of the formula:

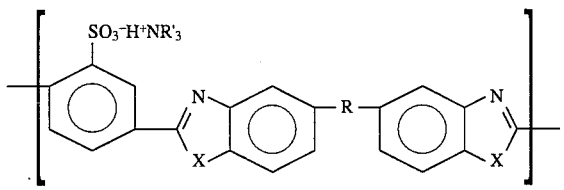

wherein X is —O— or —S—, and R is selected from the group consisting of:

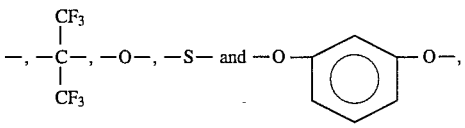

and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl, phenylethynyl, and the like. Examples of suitable alkyl groups include methyl, ethyl, butyl and the like; suitable alkaryl and aralkyl groups include benzyl, tolyl, and the like; suitable substituted aromatic groups include nitroaniline, ethynylaniline, phenylethynylaniline and the like.

These polymers are formed by the reaction of a sulfo-pendant polymer having repeating units of the formula:

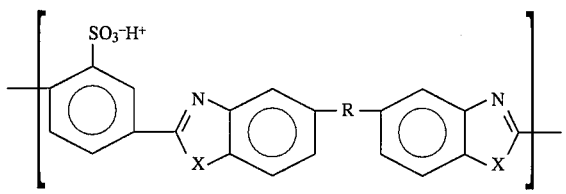

wherein X and R are as defined above, with an amine $NR'_3$, wherein R' is as defined previously, in a lower alkyl alcohol, such as methanol, ethanol or the like, at a temperature between ambient and the boiling point of the alcohol or the trialkyl amine, whichever is limiting, until a clear homogeneous solution is obtained, generally about 4 to 48 hours.

The alcohol-soluble polymers of this invention may be used for fabricating the organic/inorganic hybrid composites discussed previously. These polymers can also be used to coat materials or substrates which are susceptible to attack by highly corrosive acids. For coating a substrate with the corresponding sulfo-pendant polymer, the amine $NR'_3$ should be a relatively volatile mine, such as triethylamine, in which case an alcoholic solution of the alcohol-soluble polymer is coated onto a substrate. On drying, the ionic bond between the trialkylamine and the sulfo group is broken and the polymer reverts to the parent structure, thereby leaving a polymer coating. If the substrate material and the polymer are not adhering, the coating can be peeled off the substrate, thus providing a film of polymer.

It is also within the scope of the present invention to exchange the original amine with a less volatile amine or an amine having a desired functionality. For example, one of the aforementioned polymers can be reacted with a volatile mine, for example a lower alkyl mine, such as triethylamine, to make the polymer soluble in an alcohol such as methanol or ethanol, after which the volatile amine can be exchanged with a less volatile amine or an amine having a desired functionality, for example, an amine $NR''_3$ wherein R" is defined as R'. As used herein and in the claims, the term volatile is intended to mean having a normal boiling point of about 150° C. or below. Thus, a less volatile amine will have a higher boiling point. As one example, nitroaniline is a known chromophore, but may be difficult to disperse uniformly through a substrate. The functionality of nitroaniline can be uniformly dispersed through such a substrate by (1) reacting a polymer containing pendant sulfo groups with a volatile amine such as triethylamine in a suitable alcohol solvent, (2) exchanging N,N-dimethyl-4-nitroaniline with the triethylamine and removing the volatile triethylamine and (3) removing the alcohol solvent. The resulting material is mono-dispersed and stable. Prior to removing the solvent, the material can be coated onto a suitable substrate or placed in a mold to provide a molded article. As previously discussed, if the substrate material and the polymer are not adhering, the coating can be peeled off the substrate, thus providing a film of mono-dispersed polymer.

The sulfo-pendant polymers are formed by the polycondensation of 2-sulfoterephthalic acid with a bisaminophenol or bisaminothiophenol of the formula:

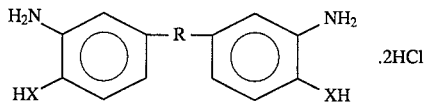

wherein X and R are as defined above. Preparation of the 2-sulfoterephthalic acid is described in Dang et al, U.S. Pat. No. 5,312,895, issued May 17, 1994. The polycondensation can be conducted as therein described.

Briefly, the polycondensation process comprises the following steps: (i) dehydrochlorination of the diamino-diol (or dithiol) dihydrochloride in the presence of the sulfo-pendant dicarboxylic acid monomer in 77% polyphosphoric acid (PPA); (ii) addition of $P_2O_5$ to raise the $P_2O_5$ content of the medium to 82–84%; (iii) chain propagation and cyclodehydration; and (iv) precipitation of the polymer into water, followed by washing and drying the polymer. Step iii may be carried out at a temperature of about 160° to 190° C. for about 4 to 64 hours. It is generally preferred to carry out the polymerization in step-wise fashion, for example, heat to 165° C. over a period of 2–4 hours, 165° C. for 16 hours, then 172° C. for 48 hours.

The organic/inorganic hybrid materials can be prepared by a number of different methods including, for example, the combination of the sulfo-pendent polymers of this invention with TMOS, as illustrated hereinafter. The ratio, by weight, of organic polymer to the metal alkoxide can range from 1:9 to 9:1.

Generally, there is initially prepared a solution of the sulfo-pendent polymer in a lower alkyl alcohol, such as methanol, at a concentration of about 1 to 10 percent (weight/volume), preferably about 6–8 percent. To this solution is added a measured amount of water and TMOS at a mole ratio (water:TMOS) of 3.0:1 to 3.5:1. The resulting mixture is stirred until an homogeneous solution is obtained. Coupling or crosslinking between the organic and inorganic polymers is promoted by the addition of a coupling agent to this mixture. Suitable coupling agents contain groups which can react with both the organic polymer and the inorganic polymer, for example, (N,N-diethyl-3-aminopropyl)trimethoxysilane, N-(3-triethoxysilyl)propyl)-4,5-dihydroimidazole, and the like. The coupling agent is used in an mount of about 1 to 15 mol %, preferably about 5 to 10 mol %, based on the inorganic polymer-forming compound.

Thereafter, the resulting semigel, in one embodiment of the invention, can be formed into a thin film by known methods, such as vacuum evaporation, or applied to a supporting substrate. If phase separation occurs, as indicated by opacity, the material can be made transparent by thermal treatment at about 60°–100° C. for about 10 minutes to 2 hours. Alternatively, it can be cast into a suitable mold, dried slowly over a period of 8 to 200 hours at room temperature, then dried under vacuum for 8 to 48 hours at 80°–100° C.

The following examples illustrate the invention:

EXAMPLE I

Preparation of Sulfo-pendant Polymer Derived from 4,4'(2,2,2-trifluoro-1-trifluoromethyl ethylidene)bis(2-aminophenol)

Into a resin flask equipped with a mechanical stirrer, nitrogen inlet and outlet, were placed 4,4'-(2,2,2-trifluoro-1-(trifluoromethyl)ethylidene)bis(2-aminophenol) (1.871 g, 5 mmol) (available from Daychem Labs, Inc. Dayton Ohio), 2-sulfoterephthalic acid monohydrate (1.35 g, 5 mmol), and polyphosphoric acid (PPA, 83% $P_2O_5$, 12.97 g). The reaction mixture was heated at 100° C. for 4 hours under nitrogen and at 180° C. for 48 hours. After cooling to room temperature, the reaction mixture was poured into water to precipitate the polymer. The precipitated copolymer was chopped in a high speed blender, then thoroughly washed with hot water, filtered and dried. 2.58 g (95% yield) of polymer with (η)= 1.1 dL/g (methanesulfonic acid, 30° C.) was obtained.

EXAMPLE II

Preparation of Sulfo-pendant Polymer Derived from 3,3'-Dimercaptobenzidine Dihydrochloride Into a resin flask equipped with a mechanical stirrer, nitrogen inlet and outlet, were placed 2-sulfoterephthalic acid monohydrate (2,378 g, 9 mmol), 3, 3'-dimercaptobenzidine dihydrochloride (2.891 g, 9 mmol), and polyphosphoric acid (PPA, 77% $P_2O_5$, 17.09 g). The reaction mixture was dehydrochlorinated under reduced pressure (176 mm Hg) while heating slowly to 65° C. The reaction mixture was maintained at 65° C. for 16 hours, raised to 85° C. for 4 hours, then cooled to 40° C. and 9.9 g of 99.9% phosphorus pentoxide ($P_2O_5$) was added to bring the polymer concentration to about 12%. The mixture was then heated at 100° C. for 16 hours, 140° C. for 24 hours and 190° C. for 24 hours. The reaction mixture was poured into water to precipitate the polymer. The precipitated polymer was chopped in a high speed blender, then thoroughly washed with hot water, filtered and dried. 3.89 g (99.4% yield) of polymer with (η)= 1.42 dL/g (methanesulfonic acid, 30° C.) was obtained.

EXAMPLE III

Preparation of Organic/Inorganic Hybrid Material I

To a mixture of 0.1 g of the polymer of Example I in 1 ml of methanol was added 0.21 ml (0.15 mmol) of triethylamine. 0.05 ml of water and 0.2 g of TEOS were then added to the solution and a clear, viscous solution was obtained. 0.0 12 ml (0.046 mmol) of (N,N-diethyl-3-aminopropyl)trimethoxysilane was added to the solution. After mixing for about 5 minutes, an homogeneous green gel was obtained. Drying at 60° C. provided a xerogel film with a composition of 53% polymer and 47% silica.

EXAMPLE IV

Preparation of Organic/Inorganic Hybrid Material II

To a mixture of 0.15 g (0.36 mmol) of the polymer of Example II in 15 ml of methanol was added 0.086 ml (0.36 mmol) of tributylamine. A clear homogeneous solution was obtained after stirring the mixture at 50° C. overnight. To the solution were added 0.094 ml (0.36 mmol) of (N,N-diethyl-3aminopropyl)trimethoxysilane 0.06 ml of water and 0.19 ml of tetramethoxysilane. After mixing for 2 hours, a wet gel was obtained, which on drying provided a xerogel film with a composition of 52% polymer and 48% silica.

Various modifications may be made in the instant invention without departing from the spirit and scope of the appended claims.

We claim:

1. An alcohol-soluble, aromatic heterocyclic polymer having repeating units of the formula:

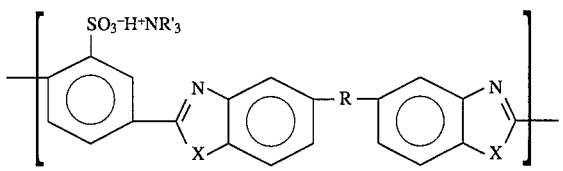

wherein X is —O— or —S—, and R is selected from the group consisting of:

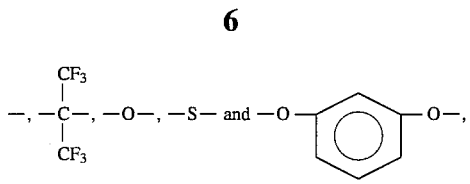

and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl and phenylethynyl.

2. The polymer of claim 1 wherein R is =C(CF$_3$)$_2$, X is —O— and R' is ethyl.

3. The polymer of claim 1 wherein R is —, X is —S— and R' is butyl.

4. An organic/inorganic hybrid material having transparency which comprises the sol-gel derived, hydrolytically condensed reaction product of a metal alkoxide of the formula M(OQ)w wherein Q is —CH$_3$ or —C$_2$H$_5$, M is Si, Ti, Al or a mixture thereof, and w is the valence value of M, and a polymer having repeating units of the formula:

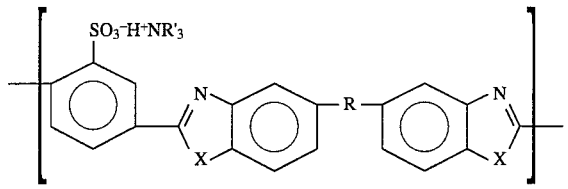

wherein X is —O— or —S—, and R is selected from the group consisting of:

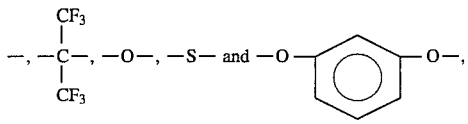

and R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl and phenylethynyl.

5. The hybrid composite of claim 4 further comprising (iii) about 1 to 15 mol % of a silane coupling agent.

6. The hybrid composite of claim 5 wherein R is =C(CF$_3$)$_2$, X is —O— and R' is ethyl, wherein said metal alkoxide is tetraethoxysilane and said coupling agent is (N,N-diethyl-3-aminopropyl)trimethoxysilane.

7. The hybrid composite of claim 5 wherein R is —, X is —S— and R' is butyl; wherein said metal alkoxide is tetramethoxysilane and said silane coupling agent is (N,N-diethyl-3-aminopropyl)trimethoxysilane.

8. A method for coating a substrate with a polymer having repeating units of the formula:

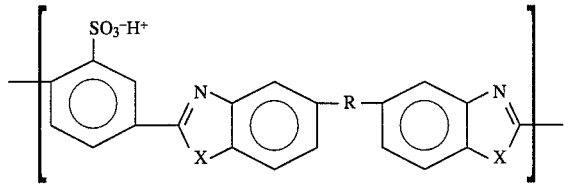

wherein X is —O— or —S—, and R is selected from the group consisting of:

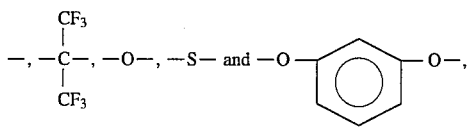

which comprises (i) reacting the polymer with an amine NR'$_3$ in a lower alkyl alcohol solvent, wherein R' is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl and phenylethynyl, (ii) coating the resulting solution onto a substrate, (iii) removing the alcohol solvent and (iv) removing the amine.

9. The method of claim 8 wherein said amine NR'$_3$ is an alkyl amine.

10. The method of claim 9 wherein said amine is triethylamine.

11. The method of claim 8 further comprising the step of peeling said coating from said substrate to provide a film.

12. A method for coating a substrate with a polymer having repeating units of the formula:

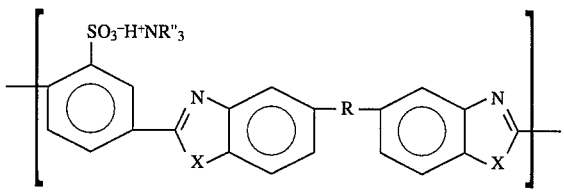

wherein X is —O— or —S—, and R is selected from the group consisting of:

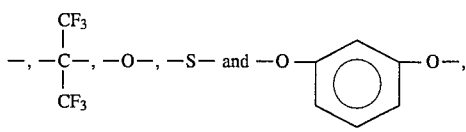

and NR"$_3$ is a non-volatile amine wherein R" is selected from the group consisting of alkyl having 1 to 5 carbon atoms, alkaryl having 7 to 12 carbon atoms, aralkyl having 7 to 12 carbon atoms and substituted aromatic having 1 to 3 substituent groups selected from the group consisting of nitro, ethynyl and phenylethynyl, which comprises (i) reacting the polymer:

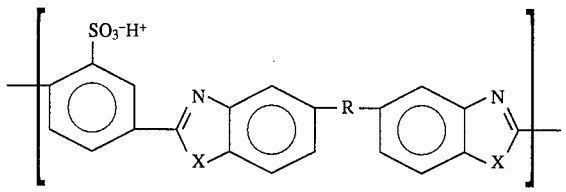

wherein R and X are as previously defined, with a volatile amine NR'$_3$, wherein R' is an alkyl group having 1 to 5 carbon atoms, in a lower alkyl alcohol solvent, (ii) exchanging a less volatile amine NR"$_3$ for said volatile amine NR'$_3$, (iii) removing the volatile amine NR'$_3$, (iv) coating the resulting solution onto a substrate, and (v) removing the alcohol solvent.

13. The method of claim 12 further comprising the step of peeling said coating from said substrate to provide a film.

* * * * *

UNITED STATES PATENT AND TRADEMARK OFFICE
CERTIFICATE OF CORRECTION

PATENT NO. : 5,492,996

DATED: : February 20, 1996

INVENTOR(S) : Thuy D. Dang et al

It is certified that error appears in the above-identified patent and that said Letters Patent is hereby corrected as shown below:

Col. 1, line 65, the colon following "Because" should be deleted.

Col. 2, line 39, the colon following "lower" should be deleted.

Col. 3, line 35, both occurrences of "mine" should read ---amine---.

Signed and Sealed this

Twenty-second Day of October, 1996

Attest:

BRUCE LEHMAN

Attesting Officer    Commissioner of Patents and Trademarks